United States Patent [19]

Kondo et al.

[11] Patent Number: 4,912,353

[45] Date of Patent: Mar. 27, 1990

[54] TWO-PIECE MOTOR STATOR

[75] Inventors: Genki Kondo; Kazushi Usui, both of Fukui, Japan

[73] Assignee: Mitsushita Electric Industrial Co., Ltd., Osaka, Japan

[21] Appl. No.: 252,553

[22] Filed: Oct. 3, 1988

[30] Foreign Application Priority Data

Oct. 2, 1987 [JP] Japan .................................. 62-250104

[51] Int. Cl.[4] .............................................. H02K 1/12
[52] U.S. Cl. ..................................... 310/259; 310/42; 310/51; 310/216
[58] Field of Search ............... 310/216, 217, 254, 255, 310/257, 258, 259, 42, 51; 336/211

[56] References Cited

FOREIGN PATENT DOCUMENTS 102662 8/1897 Fed. Rep. of Germany .
875227 3/1953 Fed. Rep. of Germany .
2353309 5/1975 Fed. Rep. of Germany .
1065965 1/1984 U.S.S.R. .

Primary Examiner—Rowe Skudy
Attorney, Agent, or Firm—Lowe, Price, LeBlanc, Becker & Shur

[57] ABSTRACT

A two-piece motor stator having; a generally annular inner iron stator core having a plurality of teeth extending radially outwardly from outer surface thereof, an annular outer iron stator core having slots in the inner surface thereof for receiving tip portions of the teeth, and coils provided around body portions of the teeth respectively before the inner and outer iron cores are combined together by press fitting, wherein the outer iron stator core has a plurality of channels made in the inner surface, the channels being formed along each of the slots for absorbing stress resulting from press fitting the tip portions into the slots in order to reduce the degree of deformation of the inner and outer stator iron cores. The channels may be made in the tip portions of the teeth instead of the inner surface of the outer iron stator. The channels also may be filled with a deformable and magnetically soft material.

13 Claims, 4 Drawing Sheets

FIG. 4 FIG. 5 FIG. 7
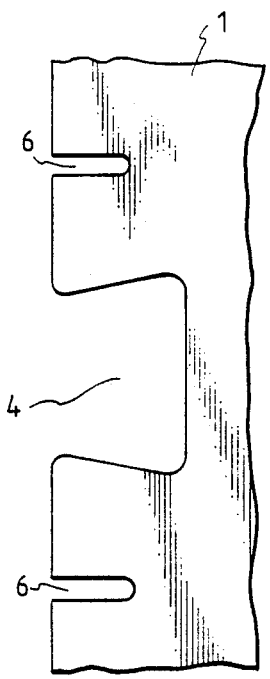
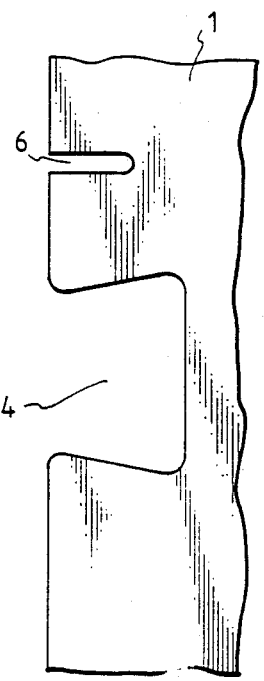
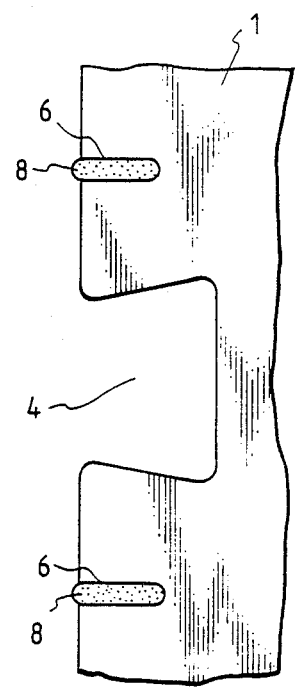
FIG. 6
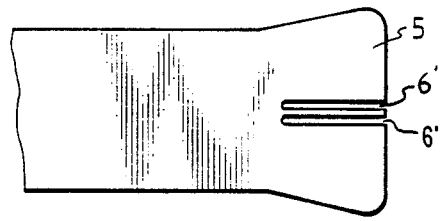
FIG. 8
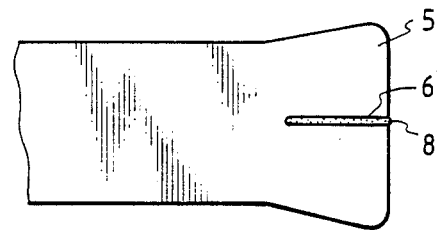

TWO-PIECE MOTOR STATOR

BACKGROUND OF THE INVENTION

1. Field of the Invention

This invention relates to a two-piece motor stator having outer and inner iron stator cores which are combined into one body by fit.

2. Description of the Prior Art

Various types of two-piece motor stators are known which are mounted in a stationary motor housing together with a rotatable rotor. The techniques of two-piece motor stator, i.e., dividing a stator core into outer and inner cores, is used for making the motor smaller and for lowering the manufacturing cost. Such a stator comprises an inner iron stator core having a plurality of teeth and an outer iron core having a plurality of slots for engaging the outer iron stator core with the same with the tip of each tooth fitted into a corresponding slot. At first, a wire is wound on each tooth to form a coil. Then, the inner iron core is engaged with the outer iron core by press fit. This structure makes the winding process easier, thereby lowering manufacturing cost.

FIG. 9 shows such two-piece motor stator combination in a fragmentary perspective view. An annular outer laminated iron core 1 is made of iron plates. Inside the outer iron core 1, a generally annular inner iron core 2 is provided with the central axis thereof coincident with that of the outer iron core 1. The outer and inner iron stator cores 1, 2 are combined by press fit, as shown in FIG. 9. The resultant stator core is assembled in an unshown motor housing together with an unshown rotor with the central axis of the outer and inner iron stator cores 1, 2 coincident with the rotation axis of the rotor. The inner iron core 2 has a plurality of teeth 5 extending radially outwardly from the outer surface thereof. A coil 3 is a wire wound around a tooth 5 of the inner iron core 2. A slot 4 is made in the inner surface of the outer stator iron core 1. The tooth 5 is provided for engaging with the slot 4. The slot 4 is formed to be complementary to the tip of the tooth 5 in cross-sectional shape. Therefore, the outer iron core 1 can be engaged with the inner stator iron core 2 with the tip of the tooth 5 fitted into the slot 4.

However, in such two-piece motor stator, the above-mentioned structure causes deformention at the inner peripheral portion of the inner iron core 2 and the outer peripheral portion of the outer iron core 1. The deformation of the former portion causes an increase in motor-running noise level, while the deformation of the latter portion results in difficult assembling.

The reasons for the deformation are as follows:

The outer and inner iron stator cores 1, 2 are engaged with the slot 4 fitted with the tooth 5 by transition or interference fit. Therefore, a considerably large power is required for fitting. Such a fit requiring large power causes stress in the outer and inner iron cores 1, 2, thereby generating such deformation.

Therefore, in the prior art two-piece motor stator, there is a drawback that undesirable deformation of the stator iron core deteriorates the performance of the motor.

SUMMARY OF THE INVENTION

The present invention has been developed in order to remove the above-described drawbacks inherent to the conventional two-piece motor stator.

It is, therefore, an object of the present invention to provide a new and useful two-piece motor stator which is capable of reducing the degree of deformation at the outer and inner iron stator cores 1, 2, which is caused by the fitting the inner and outer stators together.

According to a feature of the present invention, a plurality of channels are made in the inner surface of the annular outer iron stator core so that the channels are formed along each of the slots 4 for absorbing stress due to fitting the tips of the teeth 5 into the slots 4.

In accordance with the present invention there is provided a plurality of channels formed in the top of the teeth 5 for absorbing stress due to fitting the tips of the teeth 5 into the slots 4.

In accordance with the present invention there is also provided a deformable and magnetically soft material with which the channels are filled.

In accordance with the present invention there is also provided a two-piece motor, comprising: a generally annular inner iron stator core having a plurality of teeth extending radially outwardly from outer surface thereof, an annular outer iron stator core having slots in the inner surface thereof for receiving tips of said teeth, and coils provided around the body of said teeth respectively before said inner and outer iron cores are combined together by fit, the improvements comprise a plurality of channels made in said inner surface, said channels being formed along each of said slots.

An advantage of the present invention is that the channels reduce the power for press fit. Another advantage of the present invention is that the channels eliminate noise problems due to deformation of the stator core and assembling problem of motor, thereby providing higher productivity and increasing the quality of the motor.

BRIEF DESCRIPTION OF THE DRAWINGS

The object and features of the present invention will become more readily apparent from the following detailed description of the preferred embodiments taken in conjunction with the accompanying drawings in which:

FIG. 4 is a fragmentary plane view of the outer iron stator core of the first embodiment;

FIG. 5 is a fragmentary plane view of the outer iron stator core of the second embodiment;

FIG. 6 is a fragmentary plane view of the inner iron stator core of the third embodiment;

FIG. 7 is a fragmentary plane view of the outer iron stator core of the forth embodiment;

FIG. 8 is a fragmentary plane view of the inner iron stator core of the fifth embodiment;

The same or corresponding elements and parts are designated by like reference numerals throughout the drawings.

DETAILED DESCRIPTION OF THE INVENTION

Figure 1:
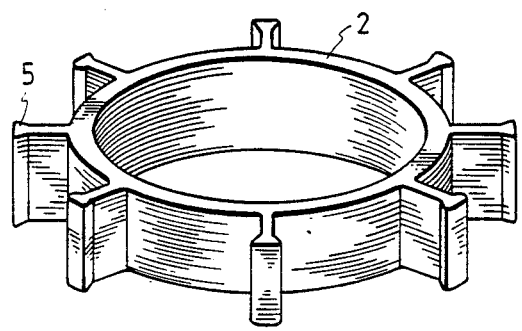
FIG. 1 is a perspective view of the inner iron stator core of the first embodiment.
Figure 2:
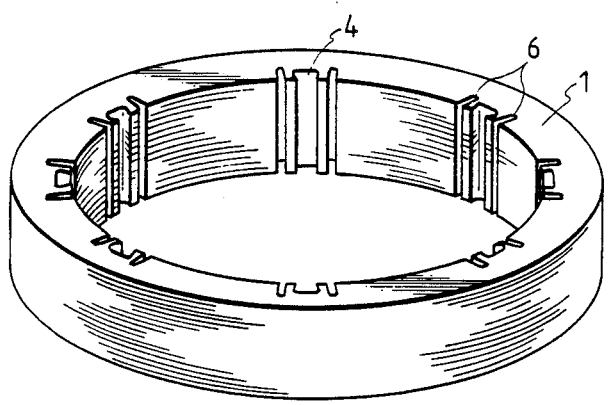
FIG. 2 is a perspective view of the outer iron stator core of the first embodiment.
Figure 3:
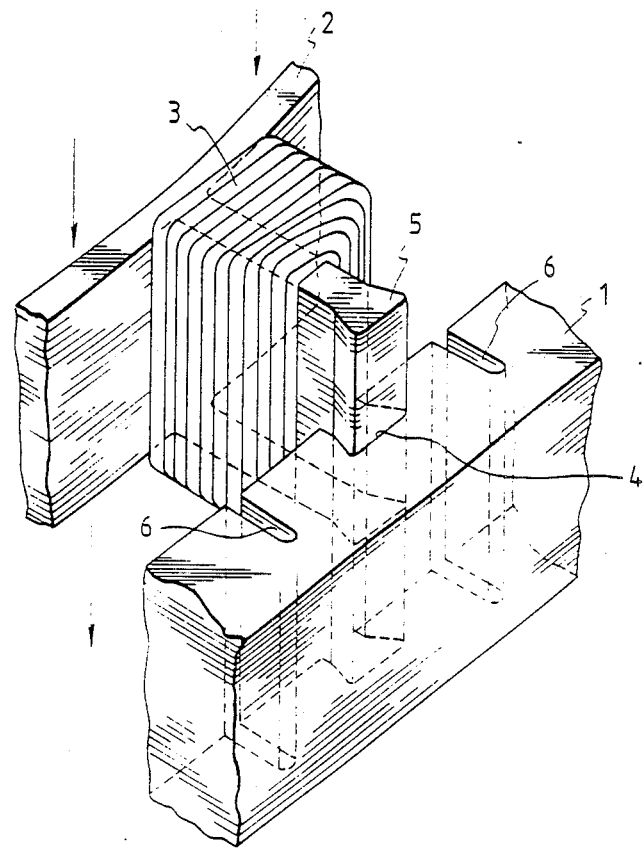
FIG. 3 is a fragmentary perspective view of the inner and outer iron stator cores of the first embodiment, which are under fitting.
Figure 9:
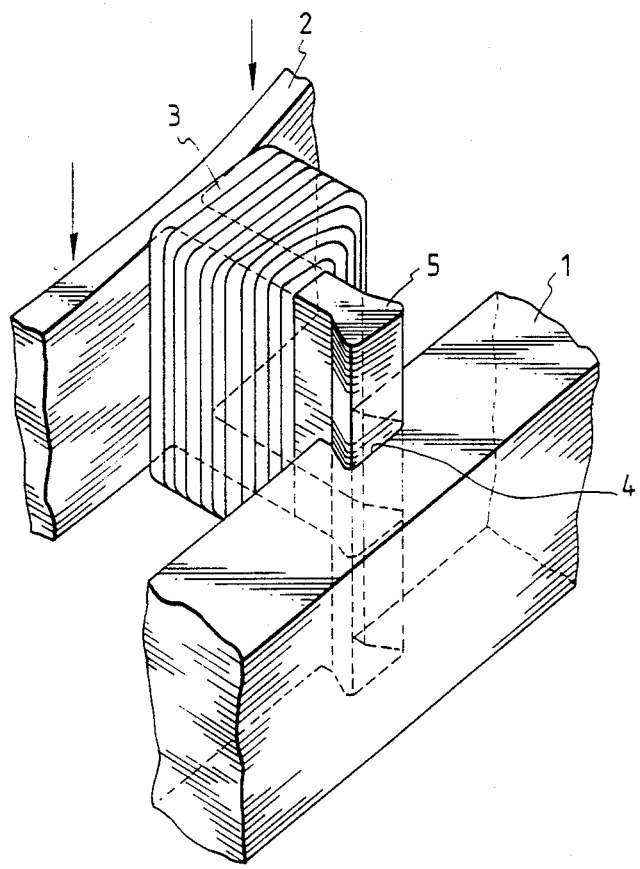
FIG. 9 is a fragmentary perspective view of the inner and outer iron stator cores of conventional two-piece motor stator, which are under fitting.

Referring to FIGS. 1, 2, and 3, schematic diagrams of first embodiment of the present invention are shown by way of a perspective view.

A generally annular inner iron stator core 2 of FIG. 1 is made of laminated iron plates. The inner iron stator core 2 has eight teeth 5 which are provided on the outer surface thereof, and which are arranged in the axial plane of the ring shape thereof, like a spur gear. FIG. 2 shows an annular outer iron stator core 1 made of laminated iron plates, which has eight slots 4 on the inner surface thereof. The position of each slot 4 corresponds to that of one of said teeth 5. The slots 4 are made to be complementary to tip of the teeth 5 in cross-sectional shape. Therefore, the outer and inner iron stator cores 1, 2 can be combined into one body with the tip of each tooth 5 fitted into a corresponding slot 4, as shown in FIG. 3. FIG. 3 shows a tooth 5 is being fitted into a slot 4. In FIG. 3, a coil is formed by winding a wire directly around the body of each tooth 5 before the outer and inner iron stator cores 1, 2 are fitted together. The outer iron stator core 1 has two channels 6 which are made near and parallel to each slot 4. FIG. 4 shows the slot 4 and the channels 6 by enlarged plan view of the outer iron stator core 1. The channels 6 are formed on the both sides of slot 4 as viewed from the center of the ring shape of the outer iron stator core 1. The major dimensions are as follows:

depth of each channel 6 is about 1.5 mm;
width of each channel 6 is about 1 mm;
distance from each slot 4 to the channel 6 is about 2 mm.
depth of the slot 4 is about 3 mm;
width of tip of the slot 4 is about 4 mm;
inside diameter of the inner iron core 2 is about 50 mm; and
outside diameter of the outer iron core 1 is about 94 mm.

However, these dimensions of the channel 6 are selected depending on hardness of the outer and inner iron stator cores 1, 2 and tolerance quality of the slot 4 and the tip of teeth 5. In FIG. 3, channels 6 are parallel with the slot 4. However, the channels 6 may be formed non-parallel with, but along the slot 4.

Hereinbelow will be described the operation of channels 6. The dimensions of the tip of the teeth 5 and the slots 4 in the cross-sectional plane are designed so as to be fitted with an interference or transition fit in order to obtain enough combined strength between the inner iron stator core 2 and the outer iron stator core 1. Accordingly, when the inner iron stator core 2 is combined with the outer iron stator core 1, stress is generated near engaging portions. The stress causes deformation of the outer and inner iron stator cores 1, 2. The deformation at the inner surface of the inner iron stator core 2 causes running noise of the motor and unevenness of torque over each revolution of the unshown rotor. The deformation at the outside surface of the outer iron stator core 1 causes a problem of assembling. The channel 6 absorbs the stress which causes such deformataion.

FIG. 5 is a fragmentary plane view of the outer iron core 1 of the second embodiment of the present invention, in which the channels 6 are formed near the slots 4 only on one side of each of slots 4 when viewed from the center of the outer iron core 1. This embodiment has an advantage of lower magnetic reluctance of the magnetic circuit which is formed by the inner iron stator core 2, teeth 5, and the outer iron stator core 1, compared with the stator core of the first embodiment.

FIG. 6 is a fragmentary plane view of the inner iron core 2 of the third embodiment of the present invention, in which a plurality of channels 6' are respectively formed in the tip of the teeth 5 in which each of the channels extends substantially radially with respect to the center of axis of the inner iron stator core 2. This embodiment has an advantage of lower magnetic reluctance of the magnetic circuit which is formed by the inner iron stator core 2, teeth 5, and the outer iron stator core 1, compared with the stator core of the first embodiment. This is because the channel 6' does not cross the magnetic flux path when the channel is not formed, so that the channel 6' does not restrict path of the magnetic flux. In addition, width of the channel 6' can be made small because the position of the channel is very close to the fitting portion. Thus, the magnetic reluctance is also reduced, compared with that of the stator core of the first embodiment.

FIG. 7 is a fragmentary plan view of the outer iron core 1 of the forth embodiment of the present invention, in which the channel 6 is filled with a deformable and magnetically soft material 8. This embodiment has an advantage of lower magnetic reluctance of the magnetic circuit because the magnetically soft material pass magnetic flux.

FIG. 8 is a fragmentary plan view of the inner iron core 2 of the fifth embodiment of the present invention, in which the channel 6 is also filled with a deformable and magnetically soft material 8. This embodiment has the advantage of lower magnetic reluctance of the magnetic circuit.

The deformable and magnetically soft material 8 of the forth and fifth embodiments is made in such a way that rubber foam containing silicon steel powder is first injected into the channels 6 or 6'. Then, the injected deformable and magnetically soft material 8 is hardened.

According to the present invention, the channel 6 or 6' absorbs the stress due to fit so as to reduce the deformation of the outer and inner iron stator cores 1, 2, thereby eliminating the above-mentioned running noise and assembling problems.

The above-described embodiments are illustrative examples of the present invention, and therefore, it will be apparent for those skilled in the art that many modifications and variations may be made without departing from the scope of the present invention.

What is claimed is:

1. A two-piece motor stator having;
a generally annular inner iron stator core having a plurality of teeth extending radially outwardly from an outer surface thereof, said teeth each comprising body and outer tip portions, an annular outer iron stator core having slots in an inner surface thereof for receiving said tip portions of said teeth, and coils provided around said body portions of said teeth before said inner and outer iron cores are combined together by press fitting, the improvement comprising:
a plurality of channels made in said inner surface of said outer iron stator core, said channels being formed adjacent each of said slots, for absorbing mechanical stress resulting from press fitting said inner and outer iron stator cores together.

2. A two-piece motor stator as claimed in claim 1, wherein each of said plurality of channels is located as near an adjacent slot as possible to absorb stress caused by press fitting said tips into said slots, but as remote from an adjacent slot as possible to provide engaging strength thereof.

3. A two-piece motor stator as claimed in claim 1, wherein said plurality of channels is provided so that one channel is located adjacent one side of each of said slots when viewed from the center of said outer iron stator core.

4. A two-piece motor stator as claimed in claim 1, wherein said plurality of channels is provided so that a channel is located adjacent both sides of each of said slots when viewed from the center of said outer iron stator core.

5. A two-piece motor stator as claimed in claim 1, wherein at least one of said plurality of channels is filled with a deformable material.

6. A two-piece motor stator as claimed in claim 5, wherein said deformable material is a magnetically soft material.

7. A two-piece motor stator as claimed in claim 5, wherein each of said plurality of channels is filled with said deformable material.

8. A two-piece motor stator having
a generally annular inner iron stator core having a plurality of teeth extending radially outwardly from an outer surface thereof said teeth each comprising body and outer tip portions, an annular core iron stator core having slots in an inner surface thereof for receiving said tip portions of said teeth before said inner and outer iron cores are combined together by press fitting, the improvement comprising:
a plurality of channels respectively made in each of said tip portions of said teeth, each of said channels extending substantially radially with respect to the center of axis of said inner iron stator core.

9. A two-piece motor stator as claimed in claim 8, wherein at least one of said plurality of channels is filled with a deformable material.

10. A two-piece motor stator as claimed in claim 9, wherein said deformable material is a magnetically soft material.

11. A two-piece motor stator as claimed in claim 9, wherein each of said plurality of channels is filled with said deformable material.

12. A two-piece motor stator as claimed in claim 7, wherein said deformable material is a magnetically soft material.

13. A two-piece motor stator as claimed in claim 11, wherein said deformable material is a magnetically soft material.

* * * * *